Figure 1:
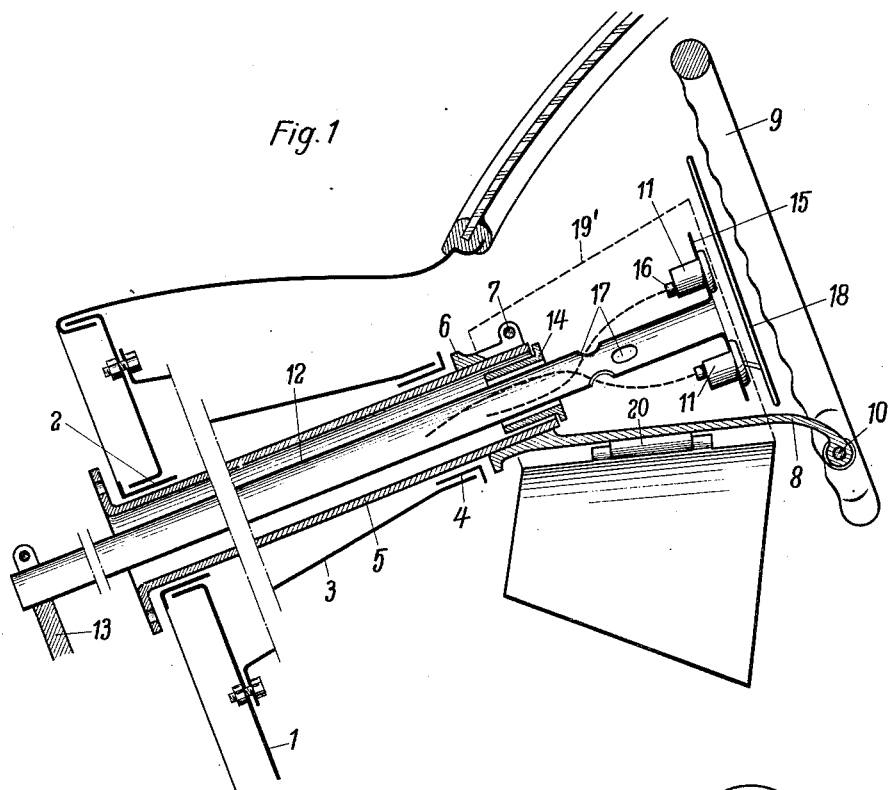

INVENTOR
BÉLA BARÉNYI
BY Dicke and Padlon
ATTORNEYS

Dec. 23, 1952  B. BARÉNYI  2,622,690
STEERING DEVICE FOR MOTOR VEHICLES
Filed Feb. 17, 1950  2 SHEETS—SHEET 2

INVENTOR
BÉLA BARÉNYI
BY Diche and Padlon
ATTORNEYS

Patented Dec. 23, 1952

2,622,690

UNITED STATES PATENT OFFICE 2,622,690

STEERING DEVICE FOR MOTOR VEHICLES

Béla Barényi, Stuttgart-Rohr, Germany

Application February 17, 1950, Serial No. 144,798
In Germany February 25, 1949

5 Claims. (Cl. 180—78)

This invention relates to a steering device for motor vehicles and has particular reference to a steering device of the kind having a set of instruments arranged inside the steering wheel or behind the same.

It is an object of the present invention to provide a simple and favourable practical arrangement of this kind ensuring a clear arrangement and easy accessibility of the instruments and of the connections thereof and a compact and well protected accommodation of the instruments.

Another object of the invention is to provide a construction which permits fitting the instruments together with the steering assembly as a self-contained unit into the finished or nearly finished vehicle.

Still another object of the invention is to provide, more particularly in connection with the arrangement of the instruments, a particularly simple and advantageous design and support of the steering wheel.

Still another object of the invention is to provide an elastic mounting for the steering wheel.

With these and further objects in view which will hereinafter appear, one feature of the present invention consists in that the instruments are arranged at the fixed steering column between the plane of the steering wheel and the hub of the steering wheel which is supported on the steering column at a larger distance therefrom and within a body of rotation described, as the steering wheel is rotated, by the spoke means connecting the steering wheel with the hub and extending parallel with the axis of the steering column or at an acute cone angle.

This arrangement apart from the easy accessibility of the instruments and their connections, primarily from the side, provides a compact and well protected accommodation of the instruments.

According to a further feature of the invention an easy accessibility and good visibility of the instruments from the driver's seat can be attained in a particularly favourable manner if the steering wheel is connected with its hub, or with the steering tube or other transmitting member transferring the steering motion, by means of a single spoke. This arrangement moreover renders it possible to mount the steering wheel elastically by means of a spring spoke. It will be understood that the resiliency of the steering wheel thus obtainable is very agreeable for the driver; moreover the steering wheel can thus be hinged to the spoke, whereby the accessibility of the instruments is further improved. The steering wheel may be designed and constructed in the form of a single ring or partial ring, for instance in the shape of a horseshoe, whose inner circular surface is not interrupted by any stiffening members impeding the sight of the driver upon the instruments. Furthermore, for protection of the instruments against damage or soiling and for attaining a smooth external appearance, shell-shaped covers may be provided which are hinged to the spokes or to the single spoke and cover the instruments from the outside. In addition to the instruments, switches for electrical installations, for instance a signal ring or the like, may be arranged on the fixed steering column.

Still another feature of the invention consists in that the instrument or the instrument board is arranged for better visibility at an inclined angle with respect to a plane disposed perpendicularly to the axis of the steering column. It is particularly favourable in this case to arrange the instrument or the instruments at an oblique angle within a tubular cover, in such a way that they are screened or shielded against light rays impinging from above. Thus practically in all cases, even in case of maximum height of the sun, the instruments can be read free from disturbing glaring or dazzling effects.

Other and further objects, features and advantages of the invention will be pointed out hereinafter and appear in the appended claims forming part of the application.

In the accompanying drawings a now preferred embodiment of the invention is shown by way of illustration and not by way of limitation.

Figure 2:
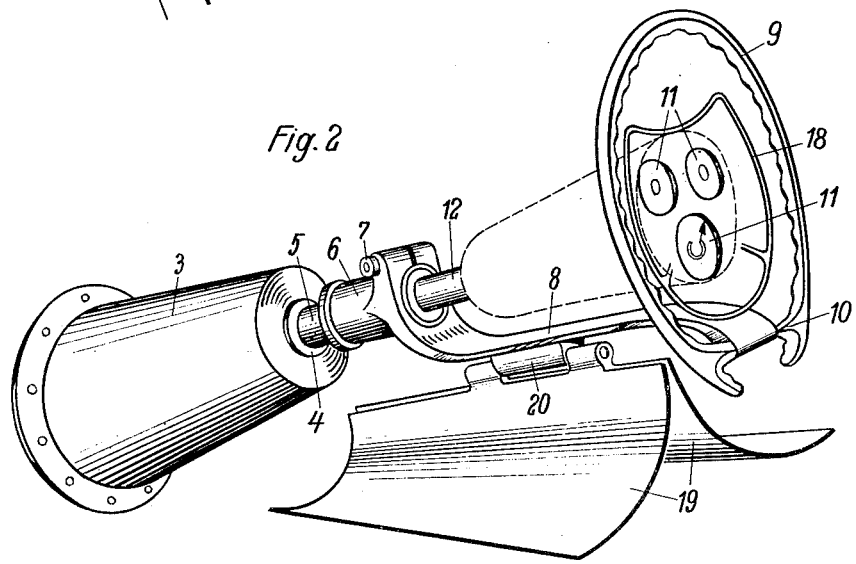
Figure 3:
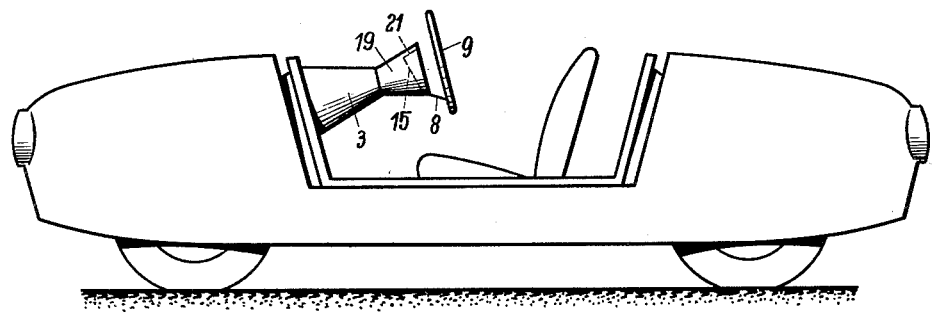

Fig. 1 is an axial section of a steering device having the invention applied thereto, Fig. 2 is a perspective view thereof, and Fig. 3 is a diagrammatic view of a motor vehicle comprising a modified steering device in accordance with the invention.

Similar reference numerals denote similar parts in the different figures.

Referring now to the drawings in greater detail, it will be noted that a rotatable steering tube 5 is mounted on the front wall 1 defining the interior space of the car body (for instance also of the middle cell of a motor vehicle constructed according to the cell system) in a bearing 2 and in a bearing 4 arranged at the upper end of the conical supporting tube 3, said steering tube serving to transmit the steering motions. Clamped on the upper end of the steering tube, for instance by a clamping screw 7, is the hub 6 of the steering wheel 9. The hub 6 and the single spoke 8 of the steering wheel 9, which spoke for instance has a flat profile and is (in a radial direction) elastically constructed, may be made in one piece.

The steering wheel 9 is hinged to the spoke 8 by a pivot 10 rigidly or in such a way that it can be hinged outwardly about the pivot 10, if desired. To this end there may be provided a releasable locking device (not shown) which normally holds the steering wheel in the position as shown. The steering wheel is designed as a simple ring or partial ring, for instance in the form of a horseshoe as shown, so that the sight of the driver through the ring to the instruments positioned therebehind is not impeded by any spokes or arms or other stiffening members.

The instruments 11 are supported by a stationary steering column 12 which is fastened at its lower end by a bearer or supporting member 13 secured to the car body or chassis, and guided in a sleeve 14 at the upper end of the steering tube 5. The stationary steering column 12 reaches to a point in the vicinity of the steering wheel 9 where it is provided with a flange 15 in which the instruments 11 are fitted. The connecting points or terminals 16 where the instruments are connected to the cables, pipes, flexible tubes, hoses, wire ropes or other connection lines or connection means as well as the openings 17 for introducing the connection lines into the steering column 12 in this case are freely accessible from the side so that the operations for connecting the instruments can be carried out without difficulties and with a satisfactory visibility. In addition to the instruments 11 as signal ring 18 is mounted on the stationary steering column 12, thus being entirely independent of the steering wheel and of the rotatable steering tube 5.

As will be seen more particularly from Fig. 1, the spoke or arm 8 is arranged at an acute angle with respect to the axis of the steering column, or, as shown in Fig. 2, nearly parallel with this axis in such a way that as the steering wheel is turned, the arm describes a body of rotation in the form of an acute cone or of a cylindrical or nearly cylindrical configuration, within which the instruments are mounted so as to be freely accessible. For protection of the same against damages or soiling, a housing consisting of conical shell-shaped covers 19 may be provided which are pivotally mounted on the spoke or arm 8 by means of hinged joints 20 and cover the instruments from outside as they are moved into the position 19'.

In the diagrammatic representation according to Fig. 3, number 3 is the steering or supporting tube which is fixedly arranged on the car body and surrounds the steering spindle, 9 is the steering wheel, which is connected to its hub secured on the end of the steering spindle, for instance by means of a single spoke or arm 8. Arranged on a stationary tube traversing the steering spindle is the instrument or the instrument board 15, comprising, for instance, a plurality of instruments. The instrument or the instrument board thus is disposed within a covering 19 which may be fixedly connected to the instrument or to the instrument board 15.

As shown in the drawing, the plane of the instruments 15 or of the instrument board is inclined with respect to a plane disposed perpendicularly to the center axis of the steering pillar, in such a way that the upper rim of the covering forms a shade 21 for the instrument or instruments 15.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A steering device for motor vehicles comprising a stationary steering column, a steering spindle concentrically surrounding said column for transmitting the steering motion, a steering wheel arranged on the steering spindle, a spoke member interconnecting the steering wheel and the steering spindle, said spoke member extending from the plane of the steering wheel to a region spaced from this plane in the direction of the steering spindle whereby as the steering wheel is turned, said spoke member describes a hollow body of rotation, hinge means for pivotally connecting the steering wheel with the spoke member, the axis of said hinge being arranged transversely to the axis of the steering column, at substantially right angles thereto, and an instrument unit arranged within said body of rotation on the stationary steering column.

2. A steering device as in claim 1, in which the arm is constructed so as to be elastic in a radial direction but substantially non-elastic in a circumferential direction.

3. A steering device as in claim 1 comprising a hub for the steering wheel which is formed integral with the arm and adapted for securing the steering wheel on the steering spindle.

4. A steering device for motor vehicles comprising an inner, relatively stationary steering wheel post adapted to retain a set of motor vehicle indicating instruments at its upper end, an outer tubular rotatable steering wheel shaft concentrically surrounding the stationary steering wheel post, said steering wheel post extending beyond said steering wheel shaft, and a spoke extending from one end of the steering wheel shaft to the steering wheel, said spoke being concentric to the steering wheel post and the steering wheel shaft, a plurality of complementary conical-shaped covers arranged in an articulated and hinged manner to said spoke, said covers enclosing the instrument set in the manner of a sleeve.

5. A steering device for motor vehicles, comprising a stationary steering column, a tubular steering spindle concentrically surrounding said column and transmitting the steering movement, a steering wheel spatially arranged on the steering spindle, spoke means connecting the steering wheel with the steering spindle and extending from the plane of the steering wheel to a region spaced from said plane in the direction of the steering spindle, whereby that as the steering wheel is turned the spoke means describe a hollow body of rotation, and an instrument unit arranged within this body of rotation on the stationary steering column, said spoke means comprising a single spoke and a pair of complementary conical-shaped covers hingedly connected to the spoke and adapted to surround the instrument unit in the form of an envelope.

BÉLA BARÉNYI.

REFERENCES CITED

The following references are of record in the file of this patent:

UNITED STATES PATENTS

| Number | Name | Date |
| --- | --- | --- |
| 1,396,195 | Grigsby | Nov. 8, 1921 |
| 2,442,288 | Floria | May 25, 1948 |
| 2,465,825 | Tucker | Mar. 29, 1949 |

FOREIGN PATENTS

| Number | Country | Date |
| --- | --- | --- |
| 712,396 | Germany | Sept. 18, 1942 |